United States Patent
Jauffret et al.

(10) Patent No.: US 11,821,809 B2
(45) Date of Patent: Nov. 21, 2023

(54) TEST BENCH FOR A ROTOR DAMPER

(71) Applicant: AIRBUS HELICOPTERS, Marignane (FR)

(72) Inventors: Laurent Jauffret, Velaux (FR); Christophe Lambert, Allauch (FR)

(73) Assignee: AIRBUS HELICOPTERS, Marignane (FR)

( * ) Notice: Subject to any disclaimer, the term of this patent is extended or adjusted under 35 U.S.C. 154(b) by 0 days.

(21) Appl. No.: 17/866,002

(22) Filed: Jul. 15, 2022

(65) Prior Publication Data

US 2023/0064144 A1    Mar. 2, 2023

(30) Foreign Application Priority Data

Aug. 31, 2021  (FR) ........................................ 2109090

(51) Int. Cl.
G01M 13/025     (2019.01)

(52) U.S. Cl.
CPC ................................. G01M 13/025 (2013.01)

(58) Field of Classification Search
CPC .................................................. G01M 13/025
See application file for complete search history.

(56) References Cited

U.S. PATENT DOCUMENTS

| | | | | |
|---|---|---|---|---|
| 5,693,896 A * | 12/1997 | Mistral | ................... | G01L 5/133 |
| | | | | 73/178 H |
| 6,832,894 B2 * | 12/2004 | Levallard | ................ | B64C 27/35 |
| | | | | 416/135 |
| 2005/0125103 A1 * | 6/2005 | Ferrer | .................... | G01H 1/006 |
| | | | | 702/56 |
| 2006/0058927 A1 * | 3/2006 | Aubourg | ............... | B64C 27/008 |
| | | | | 701/8 |
| 2008/0159862 A1 * | 7/2008 | Beroul | .................... | B64C 27/35 |
| | | | | 416/140 |
| 2010/0247312 A1 * | 9/2010 | Girard | .................... | B64C 27/51 |
| | | | | 416/134 A |

(Continued)

FOREIGN PATENT DOCUMENTS

| | | |
|---|---|---|
| CN | 207850712 U | 9/2018 |
| CN | 107192562 B | 2/2020 |

(Continued)

OTHER PUBLICATIONS

French Search Report for French Application No. FR2109090, Completed by the French Patent Office, dated May 16, 2022, 18 pages.

*Primary Examiner* — Eric S. McCall
(74) *Attorney, Agent, or Firm* — BROOKS KUSHMAN P.C.

(57) ABSTRACT

A test bench configured to test a drag damper. The test bench comprises a first support that can be rotated about a first axis by a motor, the test bench comprising a second support that can rotate about a second axis, the second axis being axially offset from the first axis, the test bench comprising a first connector secured to the first support and a second connector secured to the second support, the first connector and the second connector being offset from the first axis and the second axis, the first connector and the second connector being opposite each other along an arrangement axis and being configured to carry the damper in line with the arrangement axis.

15 Claims, 7 Drawing Sheets

(56) References Cited

U.S. PATENT DOCUMENTS

2011/0307125 A1* 12/2011 Eberhard ............... G05D 19/02
701/3

FOREIGN PATENT DOCUMENTS

| CN | 111380672 A | 7/2020 |
|----|-------------|--------|
| DE | 2936403 | 3/1981 |
| DE | 3811771 A1 | 11/1988 |

* cited by examiner

TEST BENCH FOR A ROTOR DAMPER

CROSS REFERENCE TO RELATED APPLICATIONS

This application claims priority to French patent application No. FR 21 09090 filed on Aug. 31, 2021, the disclosure of which is incorporated in its entirety by reference herein.

TECHNICAL FIELD

The present disclosure relates to a test bench for a rotor damper.

BACKGROUND

On a helicopter rotor, a damping device may connect a blade to the rotor hub or may connect two consecutive blades together. Such a damping device is referred to, in particular, as a "drag damper" or sometimes as a "frequency adapter with incorporated damping". The term "damper" is used hereinafter.

Such a damper is subject to various physical stresses during flight. In particular, such a damper is in particular subjected to the centrifugal force resulting from its rotation about the axis of rotation of the rotor, forces introduced by the blade or blades articulated to the damper, intrinsic internal forces, thermal stresses due to internal components of the damper heating up, and thermal convection created during the rotation of the rotor.

Replicating the various stresses experienced during a test phase in a laboratory is challenging.

In addition to installation differences, dampers may be based on different technologies, for example hydraulic, elastomeric or viscoelastic technologies, different speeds of rotation and different attitudes in space. These differences may make it difficult to design a test bench that can be used to test different dampers.

A known test bench comprises a fatigue testing machine that can stretch and compress the damper. Heavy objects are hung from cables attached to the damper in order to simulate some of the effects of centrifugal force.

Such a test bench is beneficial, but it may be difficult to accurately replicate the actual conditions of use on an aircraft, in particular as regards the centrifugal force, dynamic behaviors, precession phenomena and thermal phenomena that are experienced.

Documents CN 107 192 562 B, CN 207 850 712 U, DE 38 11 771 A1, DE 29 36 403 A1 and CN 111 380 672 are far removed from the problem of the present disclosure.

SUMMARY

The object of the present disclosure is therefore to propose a test bench that aims to achieve test conditions that are closer to the actual conditions of use.

The disclosure therefore relates to a test bench configured to test a drag damper. The test bench comprises a first support that can be rotated about a first axis by a motor, the test bench comprising a second support that can rotate about a second axis, the second axis being axially offset from the first axis, and therefore not coaxial, along at least one geometric axis, the test bench comprising a first connector secured to the first support and a second connector secured to the second support, the first connector and the second connector being offset from the first axis and the second axis, the first connector and the second connector being opposite each other along an arrangement axis and being configured to carry said damper in line with said arrangement axis.

Therefore, the damper to be tested is fastened to the first connector and to the second connector. The dimensions of the first connector and the second connector are possibly determined such that the damper is positioned in relation to the first axis in the same way as on an actual rotor to be equipped with this damper.

The first support is then set in rotation in the reference frame of the test bench about the first axis by the motor. The first support may be set in rotation at the speed of rotation of the actual rotor that is to be equipped with the damper to be tested. The second support is set in rotation in relation to the reference frame about the second axis indirectly via the motor and the first support and/or directly via its own drive unit. In all cases, the first support and the second support may be moved together, in phase.

An adjustment of the eccentricity E allows the first axis and the second axis not to be coaxial. Owing to the offset between the second axis and the first axis, the damper is subjected to compression and traction when it moves about the first axis and second axis. The stroke of a working rod of the damper relative to its body changes by a value equal to plus or minus the eccentricity E over one revolution.

The test bench may therefore make it possible to obtain test conditions identical to the conditions experienced in flight on a real rotor when the speeds of rotation and the arrangement of the damper are identical to real conditions. Therefore, the test bench makes it possible to replicate the actual operation of the damper within a rotor by subjecting it to the same movements and to the same centrifugal force. In particular, the effects of centrifugal force on moving components and seals of the damper are replicated. The test bench therefore makes it possible to obtain accurate and reliable test results.

The test bench may also comprise one or more of the following features, taken individually or in combination.

According to one possibility, the test bench may comprise a fixed annular channel for collecting liquid, the annular channel surrounding the first support and the second support in a radial plane orthogonal to the first axis.

The channel surrounds a cylindrical space in which the damper to be tested moves, driven at least by the motor. In the presence of a damper comprising a hydraulic fluid, the channel allows the fluid to be collected in the event of a possible leak. Indeed, the centrifugal force tends to send the fluid towards the channel.

Therefore, the sealing of the damper may be tested in conditions identical to real conditions. The channel makes it possible to collect the fluid that may be ejected during the test following a leak, for cleanliness purposes and/or in order to quantify the leak so as to be able to repair the damper effectively if required.

Said test bench may optionally comprise a measurement sensor measuring the presence of fluid in the channel or in a drain of the channel, said measurement sensor communicating with a shutdown controller capable of triggering an automatic shutdown of said motor.

The term "drain" denotes and object or a system for directing the collected fluid to the measurement sensor. The drain may comprise a hole in the channel, at least one pipe, and/or a container, etc.

The measurement sensor may comprise, for example, a gauge measuring the volume of fluid collected in a container or a pipe. If required, the controller may trigger an automatic shutdown of the motor in order to stop the test in the event of a leak that is considered major, for example in the event of a volume of collected fluid higher than a volume threshold.

According to one possibility compatible with the preceding possibilities, the test bench may comprise at least one monitoring sensor to be chosen from a list comprising: a temperature sensor to be arranged on the damper, a movement sensor to be arranged on the damper, a pressure sensor to be arranged on the damper, and a force sensor to be arranged on the damper.

At least one monitoring sensor may measure the value of a parameter representative of the operation of the tested damper.

According to one possibility compatible with the preceding possibilities, the test bench may comprise at least one bearing carrying a shaft constrained to rotate with the second support, said test bench comprising a rotating electrical or optical collector secured to said shaft and a non-rotating collector, the rotating collector being connected to at least one monitoring sensor.

Each monitoring sensor thus transmits a monitoring signal to the rotating collector which transfers it to the non-rotating collector. The non-rotating collector may in turn transmit the signal to the abovementioned controller or the like.

The rotating collector and the non-rotating collector may together form a brush or optical collector, for example. The rotating collector and the non-rotating collector may allow power to be supplied to an electrical device rotating together with the tested damper, such as a camera, for example, as set out below.

The shaft may optionally be hollow. According to one possibility, the non-rotating collector may then be arranged in the shaft in order to facilitate its arrangement.

According to one possibility compatible with the preceding possibilities, the first support and the second support may be synchronized to rotate in phase.

According to one possibility compatible with the preceding possibilities, the test bench may comprise a transmission device linking the first support to the second support, the transmission device being deformable in order to at least give the second support a restricted degree of freedom relative to the first support.

Moreover, the transmission device may be at least flexurally deformable. The first support and the second support are thus coupled by means of a transmission device permitting relative radial and/or axial movement between this first support and this second support. The first axis may be fixed in a reference frame of the test bench while the second axis may be moved in relation to the chassis along at least one geometric axis in order to obtain an adjustable eccentricity E between the first axis and the second axis. The transmission device allows the first support and the second support to be linked, permitting such an axial offset and a relative angular movement between them in relation to the first axis while ensuring a homokinetic movement between a tube connected at the input to the first support and a shaft connected at the output to the second support.

The translational movement of the second axis in relation to the first axis and therefore the second support in relation to the first support allows the stroke imposed on the damper to be determined. For example, in order to obtain a stroke of ±2.5 mm (millimeters) imposed on the damper, the second support is axially offset from the first support by 2.5 mm.

The transmission device may have a length, parallel to the first axis, that is maximized in order to achieve a maximum angular offset with respect to the allowable deformations of flexible parts of this transmission device.

Additionally, or alternatively, the test bench may comprise a drive unit setting the second support in rotation.

The drive unit allows for more latitude in the introduction of forces into the damper or makes it possible to vary the forces experienced over a revolution, for example in order to simulate a gust of wind.

According to one possibility compatible with the preceding possibilities, the first axis may be fixed in a reference frame of the test bench, the second support being able to be carried by a support member that is able to move relative to a base that is fixed in the reference frame of the test bench in order to axially offset the second axis in relation to the first axis.

A precise axial offset may thus be obtained relatively easily by moving the support member relative to the base.

For example, the test bench may comprise a shaft constrained to rotate with the second support and guided in rotation about the second axis by at least one bearing, the bearing being secured to the support member, a position of the support member in relation to the base being adjustable according to at least one axis not parallel to the first axis in order to adjust an axial offset of the second axis in relation to the first axis.

According to one possibility compatible with the preceding possibilities, the first connector and the second connector may each comprise a clevis traversed by a pin that may extend parallel to the first axis so as to pass through a ball-and-socket fitting of the damper.

Two ball-and-socket fittings of the damper may be connected quickly and easily to the first connector and the second connector respectively.

According to one possibility compatible with the preceding possibilities, the first support and the second support may be nested in one another in a radial plane orthogonal to the first axis, one of said first and second supports passing through a passage of the other support orthogonally to the first axis.

In order to ensure that the forces introduced into the first support and the second support do not to unduly deform them, so as not to distort the test, the first support and the second support may extend as far as possible in the radial plane passing through the center of rotation of the ball-and-socket fittings of the damper, if applicable. To this end, the first support and the second support may be nested in one another, without contact.

For the same purpose, the stiffness levels of the first support and the second support may be chosen such that the forces introduced into the first support and the second support do not affect the stroke of the damper by more than one percent, for example.

According to one possibility compatible with the preceding possibilities, the first connector and the second connector may be removable.

The test bench may be used to test various dampers.

Therefore, the first support and the second support may remain unchanged irrespective of the damper that is being tested. However, the test bench may then comprise various first connector/second connector assemblies, each assembly corresponding to at least one type of damper. The switch from testing one damper to another may therefore involve changing the first and second connectors. This change may possibly include modifying the axial offset of the first axis and the second axis, and/or changing a setpoint speed of rotation of the motor.

Alternatively, the first connector and the first support may form a one-piece component and/or the second connector and the second support may form a one-piece component.

According to one possibility compatible with the preceding possibilities, the test bench may comprise a fan turned towards the first support and the second support.

A fan may be used to direct an air flow, which is preferably heated or cooled in relation to the ambient air, with a heat exchanger, towards the damper in order to replicate the actual thermal conditions that the damper is likely to experience as accurately as possible.

According to one possibility compatible with the preceding possibilities, the test bench may comprise a camera that is able to rotate about the first axis or the second axis and is turned at least towards a space situated between the first connector and the second connector.

The term "camera" denotes a device for capturing a series of images.

A camera may for example be carried by a support or a connector in order to capture images of the damper. The camera therefore makes it possible to generate images of the damper during the test in order to be able to observe the behavior of the damper in its own reference frame.

BRIEF DESCRIPTION OF THE DRAWINGS

The disclosure and its advantages appear in greater detail in the context of the following description of embodiments given by way of illustration and with reference to the accompanying figures, in which.

DETAILED DESCRIPTION

Elements that are present in more than one of the figures are given the same references in each of them.

Three directions X, Y, and Z orthogonal to each other are shown in the figures and represent a reference frame of the test bench.

The direction X is referred to as the longitudinal direction. Another direction Y is referred to as the transverse direction. Finally, a third direction Z is referred to as the direction in elevation. The term "longitudinal" is relative to any direction parallel to the first direction X. The term "transverse" is relative to any direction parallel to the second direction Y. The expression "in elevation" is relative to any direction parallel to the third direction Z.

Figure 1:
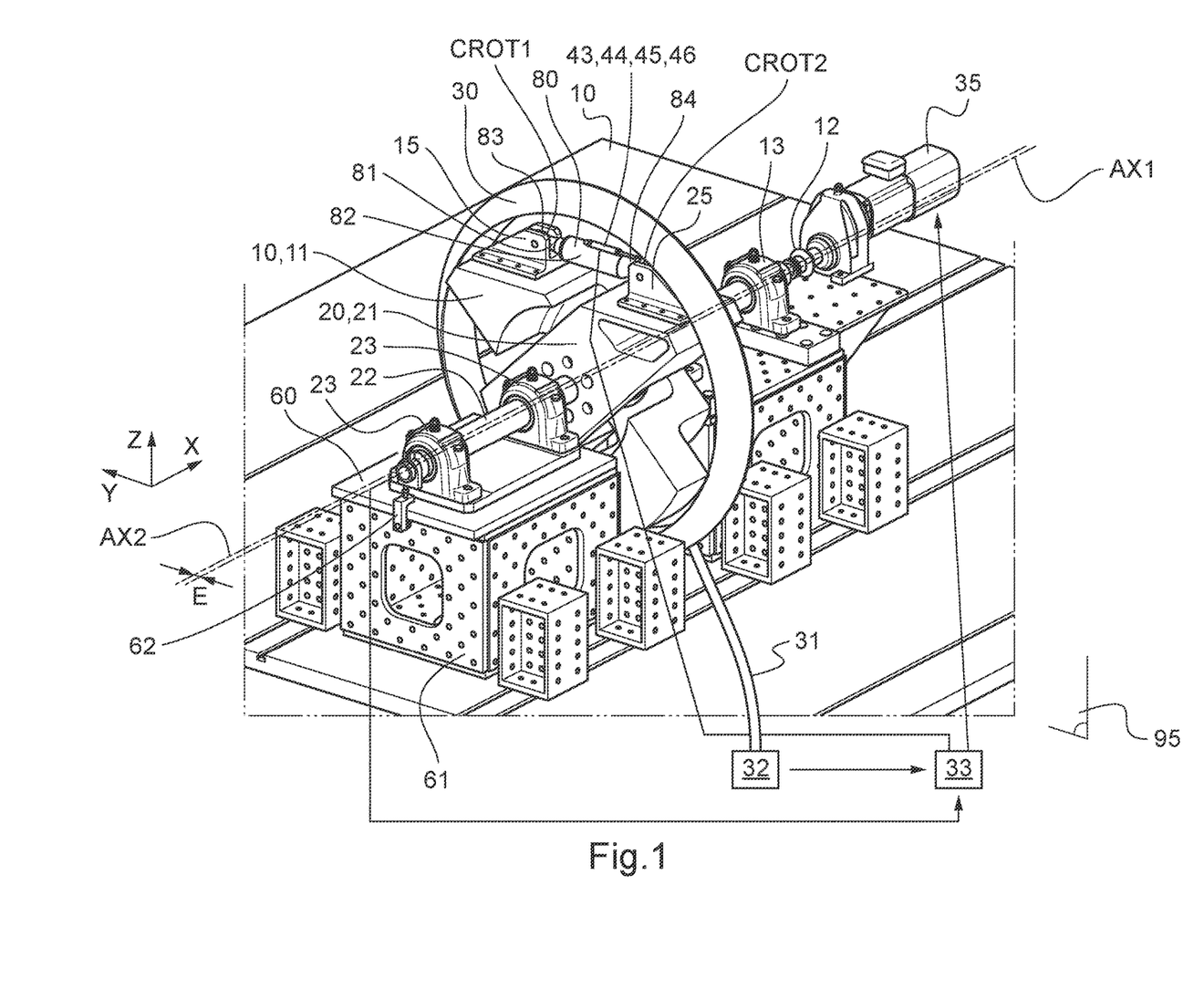
FIG. 1 is a three-dimensional view of the test bench from a first point of view.

FIG. 1 shows a test bench 1 according to the disclosure. The purpose of the test bench 1 is to test a drag damper 80 in conditions close or indeed identical to the real conditions encountered on an aircraft rotor. Such a damper 80 may extend from a first end fitting 83 to a second end fitting 84.

The first end fitting 83 and the second end fitting 84 may be ball-and-socket fittings allowing rotation respectively about two centers of rotation CROT1, CROT2. For example, the damper 80 to be tested comprises a body 81 secured to one of the end fittings 83, 84 and a working rod 82 secured to the other end fitting 83,84.

To this end, the test bench 1 comprises a first support 10 set in rotation, in said reference frame, about a first axis of rotation AX1 by a motor 35. For example, the first support 10 is secured to a tube 12 that extends along the first axis AX1. The tube 12 may be guided in rotation about the first axis AX1 by first bearings 13. The first bearings 13 are fastened to a floor or to a table 100 directly or indirectly via a chassis 63. Moreover, the tube 12 is secured to an output shaft of the motor 35 by conventional components. The motor 35 may be a rotary electric motor. Therefore, the rotation of the output shaft of the motor 35 causes the tube 12 and the first support 10 to rotate about the first axis AX1 in said reference frame. The first axis AX1 is parallel to the longitudinal axis X of the reference frame of the test bench 1.

The test bench 1 also comprises a second support 20 that is able to rotate in said reference frame about a second axis AX2. The second axis AX2 may be parallel to the first axis AX1 and to the longitudinal axis X. Moreover, the second axis AX2 may be axially offset in relation to the first axis AX1.

For example, the second support 20 is constrained to rotate with a shaft 22. The shaft 22 is guided in rotation about the second axis AX2 by second bearings 23 attached to a support member 60.

In order to axially offset the second axis AX2 in relation to the first axis AX1 along at least one geometric axis, the first axis AX1 may be fixed in the reference frame of the test bench 1, unlike the second axis AX2. To this end, the support member 60 may be reversibly fastened to a base 61 by means of at least one fastener 62, during a test phase. The base 61 may be a table or a floor 100 or may rest on such a table or such a floor 100 according to the example shown. Conversely, the support member 60 may be moved in relation to the base 61 during an axial offsetting operation. During such an operation, an operator may detach the fastener or fasteners 62 and may, for example, slide the support member 60 along the transverse axis Y over the base 61 in order to move the second axis AX2 laterally further away from or closer to the first axis AX1.

In any event, the support member 60 may be moved in relation to the base 61 along at least one axis Y, Z or along any axis that is not parallel to the first axis AX1 in order to obtain an adjustable eccentricity E between the first axis AX1 and the second axis AX2.

Moreover, the test bench 1 comprises connectors 15, 25 for attaching the damper 80 to be tested to the first support 10 and to the second support 20.

Figure 2:
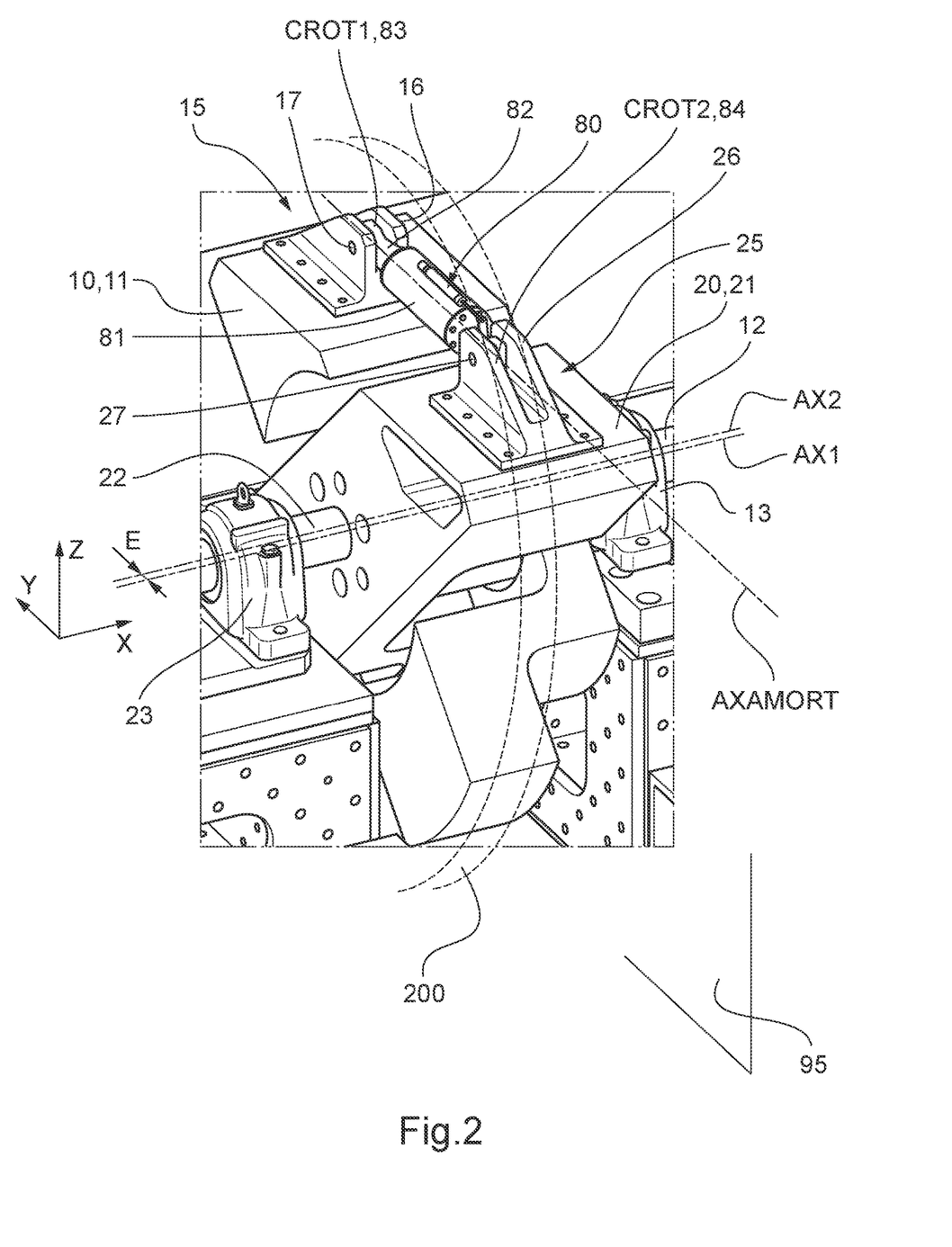
FIG. 2 is a three-dimensional view of the first support and the second support.

In reference to FIG. 2, the first support 10 is secured to a first connector 15. The first connector 15 may be a constituent part of the first support 10 or may be fixed in a conventional and reversible manner to the first support 10, for example by screws or the like.

Moreover, the first connector 15 is suitable for being connected to the damper 80 and, for example, to its first end fitting 83. For example, the first connector 15 comprises a first clevis 16 cooperating with a first pin 17 suitable for being inserted into the first end fitting 83. For example, the first clevis 16 is a female clevis with two cheeks between which the first end fitting 83 is arranged, the first pin 17 passing successively through a first cheek of the first clevis 16, the first end fitting 83, then a second cheek of the first clevis 16. The first pin 17 may be parallel to the first axis AX1.

Similarly, the second support 20 is secured to a second connector 25. The second connector 25 may be a constituent part of the second support 20 or may be fixed in a conventional and reversible manner to the second support 20, for example by screws or the like.

Moreover, the second connector 25 is suitable for being connected to the damper 80 and, for example, to its second end fitting 84. For example, the second connector 25 comprises a second clevis 26 cooperating with a second pin 27 suitable for being inserted into the second end fitting 84. For example, the second clevis 26 is a female clevis with two cheeks between which the second end fitting 84 is arranged, the second pin 27 passing successively through a first cheek of the second clevis 26, the second end fitting 84, then a second cheek of the second clevis 26. The second pin 27 may be parallel to the first axis AX1.

Moreover, the first connector 15 and the second connector 25 are opposite each other along an arrangement axis AXAMORT along which the damper 80 extends. If applicable, the first and second centers of rotation CROT1, CROT2 are positioned on this arrangement axis AXAMORT.

Moreover, the first connector 15 and the second connector 25 are situated in a cylindrical space 200 that is shown schematically. A radial plane 95 orthogonal to the first axis AX1 intersects this cylindrical space, and indeed passes through the first center of rotation CROT1 and the second center of rotation CROT2, as the case may be.

Furthermore, the first connector 15 and the second connector 25 are offset, radially in relation to the first axis AX1, i.e., along axes orthogonal to the first axis AX1. The damper 80 may thus be located in a position in relation to the first axis AX1 that is strictly identical to its theoretical position within a rotor in relation to the axis of rotation of the rotor.

Figure 3:
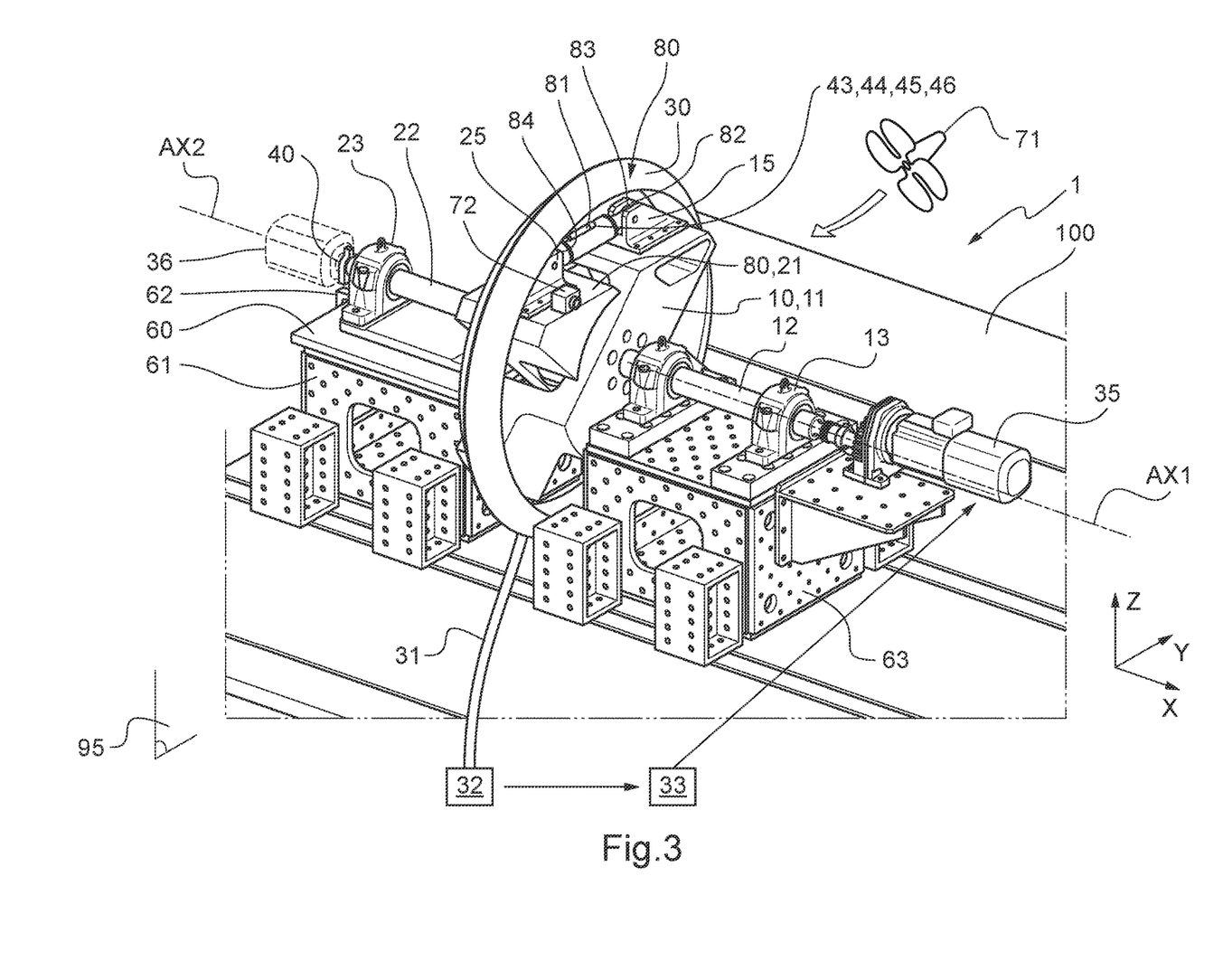
FIG. 3 is a three-dimensional view of a test bench according to FIG. 1 from a second point of view.

According to another aspect and in reference to FIG. 3, the first support 10 and the second support 20 may be nested in one another in the radial plane 95 orthogonal to the first axis AX1, without contact.

Figure 4:
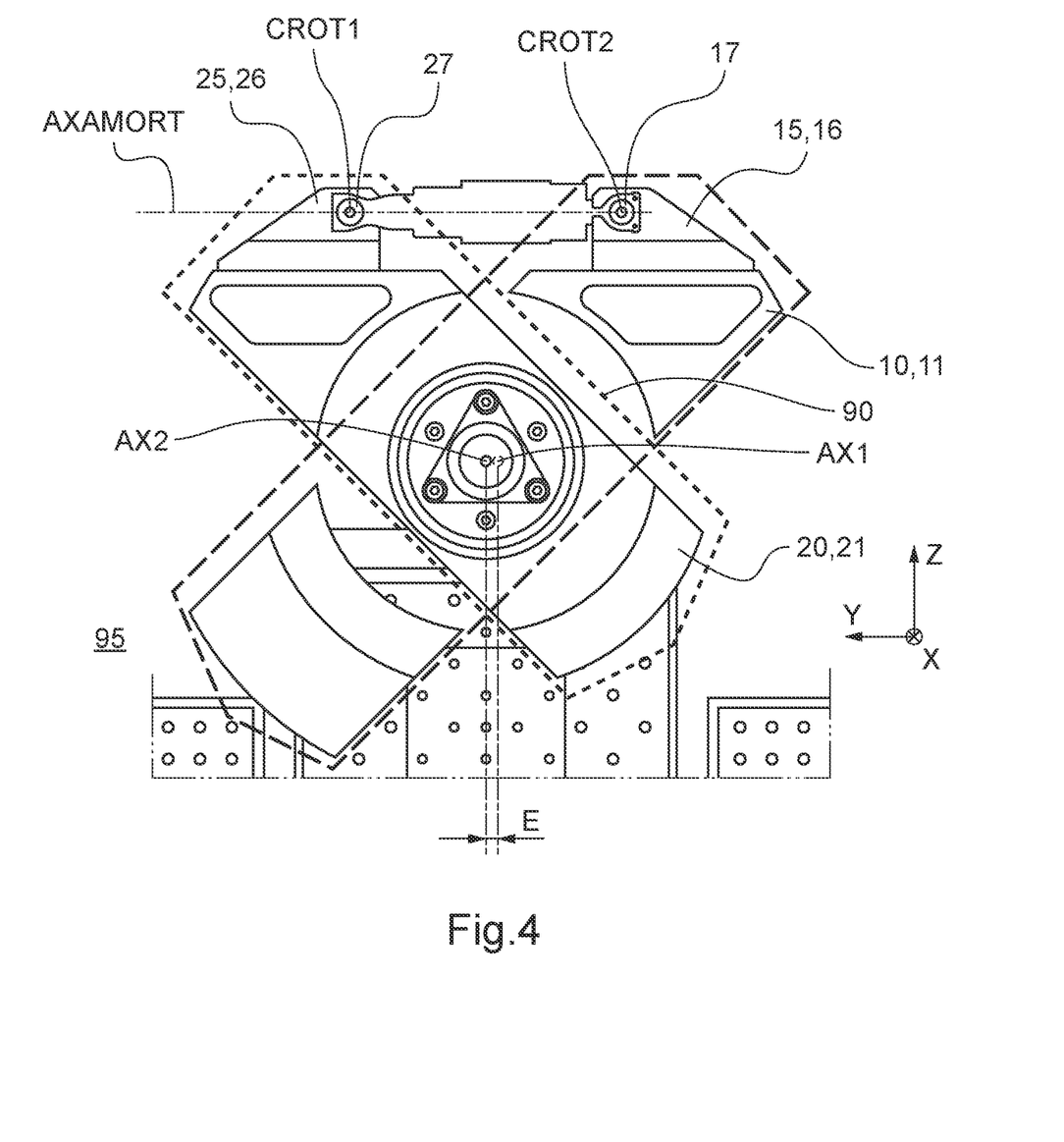
FIG. 4 is a cross-sectional view of a test bench according to a plane perpendicular to the axis AX1 of FIG. 1.

In reference to FIG. 4, one support 20 may pass through a passage 90 of the other support 10, radially in relation to flexural the first axis AX1. For example, one support 20 may be in the form of an arm and the other support 10 is U-shaped so as to be traversed by the arm.

According to another aspect and in reference once more to FIG. 3, the test bench 1 may comprise an annular channel 30 that is fixed in the reference frame of the test bench 1. The channel 30 surrounds the first support 10 and the second support 20 in the radial plane 95. Therefore, the channel 10 delimits the abovementioned cylindrical space 200 within which the damper 80 moves during the test phase.

The test bench 1 optionally comprises a measurement sensor 32 for evaluating the quantity of fluid collected by the channel 30. Such a measurement sensor 32 may comprise a gauge or the like. For example, the measurement sensor 32 evaluates the quantity of fluid in a drainage system referred to more simply as a "drain 31". According to the example shown, this drain 31 comprises a pipe leading from a hole arranged at a low point in the channel 30 to a container. The measurement sensor 32 then emits an electrical or optical measurement signal depending on the quantity of fluid in the container, for example.

A controller 33 receives the measurement signal. The controller 33 may decode the measurement signal in order to deduce therefrom the quantity of fluid collected and compare it with a stored threshold. The controller 33 may be connected to the motor 35. Therefore, the controller 33 may be configured to transmit a shutdown signal to the motor 35 if the quantity of fluid measured is higher than the stored threshold.

The controller 33 may be provided with one or more processing units that may comprise, for example, at least one processor and at least one memory, at least one integrated circuit, at least one programmable system, at least one logic circuit, these examples not limiting the scope given to the expression "processing unit". The term "processor" may refer equally to a central processing unit (CPU), a graphics processing unit (GPU), a digital signal processor (DSP), a microcontroller, etc.

Irrespective of these aspects, the test bench 1 may comprise a fan 71. The fan 71 is turned towards the first support 10 and the second support 20, for example substantially in the radial plane 95. The fan 71 may optionally also be used to cool or heat the ambient air.

Irrespective of these aspects, the test bench 1 may comprise a camera 72. The camera 72 may be able to rotate, in the reference frame of the test bench 1, about the first axis AX1 or the second axis AX2, and be turned at least towards the space situated between the first connector 15 and the second connector 25 in order to acquire images of the damper 80. For example, the camera 72 is fixed to a support 10, 20 or to a connector 15, 25.

Moreover, the test bench 1 may comprise at least one monitoring sensor such as:
  a temperature sensor 43 to be arranged on the damper 80, such as a conventional temperature probe, for example;
  a movement sensor 44 to be arranged on the damper 80, such as a position sensor, for example;
  a pressure sensor 45 to be arranged on the damper 80, such as a pressure sensing device, possibly with strain gauges; and/or
  a force sensor 46 to be arranged on the damper 80, such as a force sensing device with strain gauges, for example.

In order to transmit measurement signals from at least one monitoring sensor 43-46 and/or at least one camera 72 from the rotating reference frame associated with the damper 80 to the reference frame of the test bench 1, the test bench 1 may comprise a collector 40.

Figure 5:
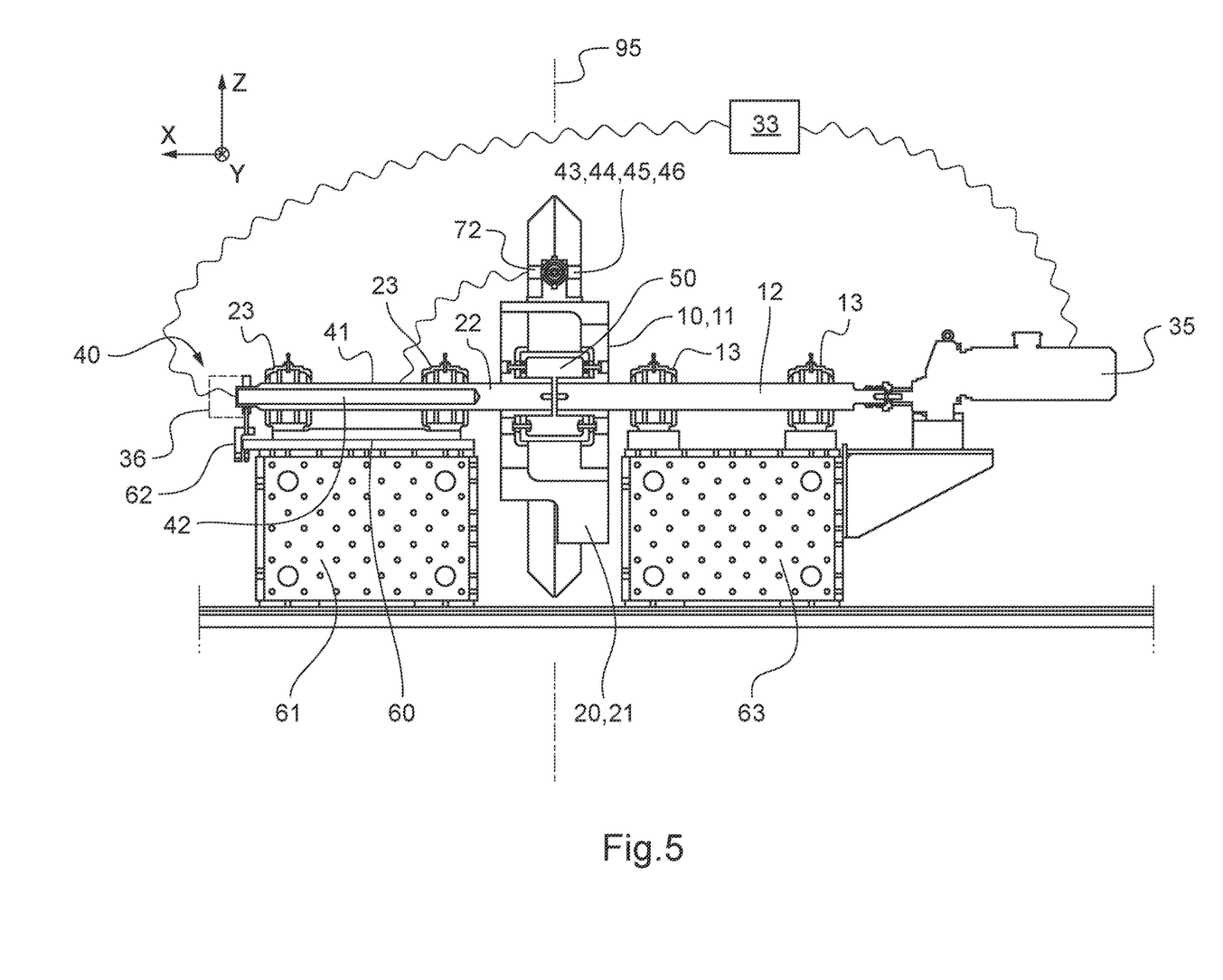
FIG. 5 is a cross-sectional view of a transmission device according to a plane passing through the axis AX1 of FIG. 1.

FIG. 5 shows a collector 40 provided with a rotating electrical or optical collector 41 secured to the shaft 22 and a non-rotating collector 42. The rotating collector 41 is connected electrically or optically to each monitoring sensor 43, 44, 45, 46 and to each possible camera 72. The non-rotating collector 42 may be connected to the controller 33, for example.

According to the possibility shown, the rotating collector 41 and the non-rotating collector 42 are arranged in the shaft 22, this shaft 22 being hollow.

Irrespective of the aspects above, the first support 10 and the second support 20 may be synchronized to rotate in phase.

According to one variant, the shaft 22 may be secured to a drive unit 36 shown with dashed lines in FIG. 5.

Additionally, or alternatively, the test bench 1 may comprise a transmission device 50 connecting the first support 10 to the second support 20. The transmission device 50 is deformable in order to at least give the second support 20 a degree of freedom relative to the first support 10.

Figure 6:
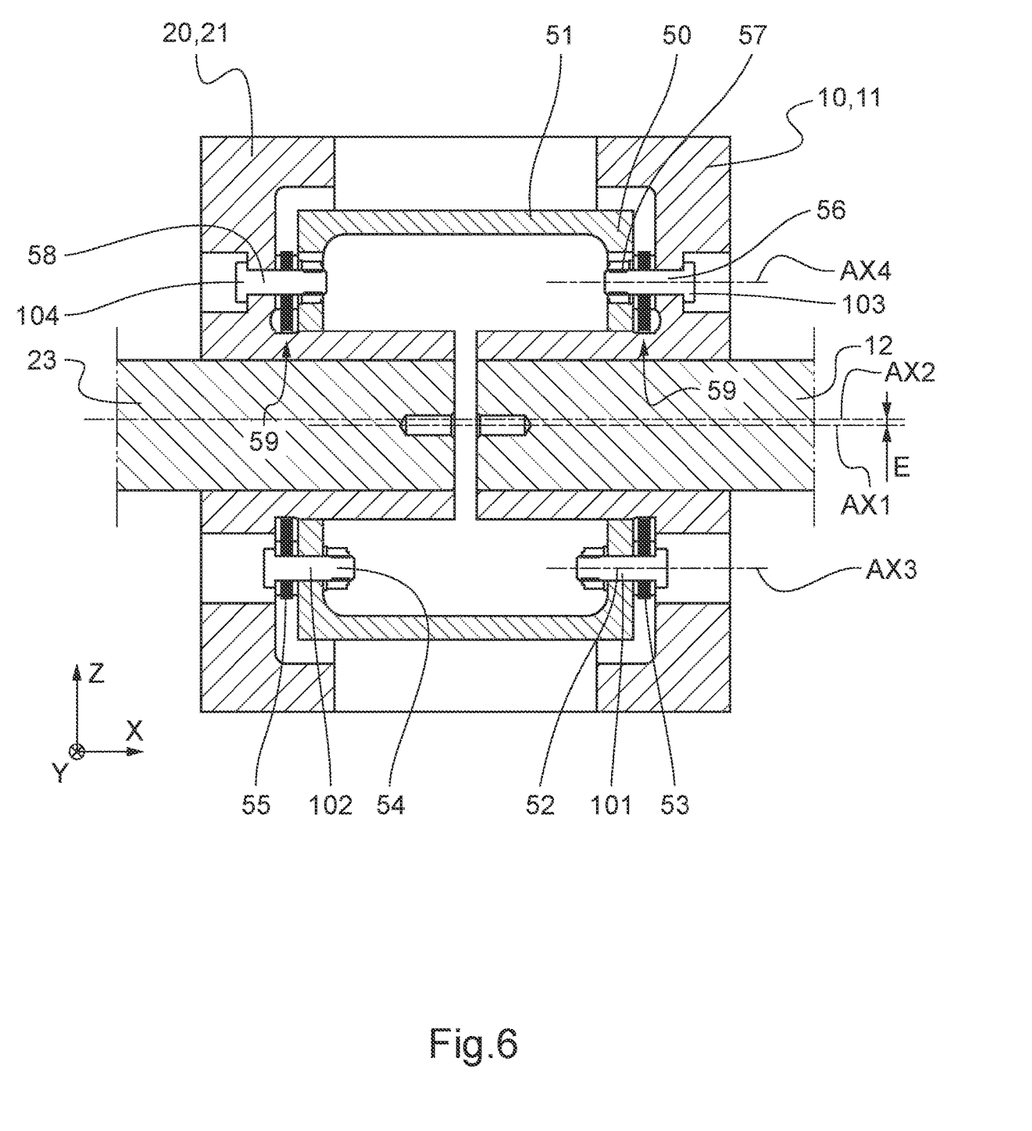
FIG. 6 is a cross-sectional view of the first support and the second support and the transmission device between the two.

FIG. 6 shows an example of a transmission device 50. The transmission device comprises a hub 51 connected to the first support 10 and to the second support 20 via members that are deformable in order to allow axial and possibly angular offsetting of the first and second supports 10, 20.

The hub 51 may comprise at least one first hole 52 through which a first screw 101 passes, the first screw 101 simply having an assembly clearance with the hub 51. Moreover, the first screw 101 passes through a first deformable member 53 arranged in a hole in the first support 10 in order to be screwed to a nut. Such a deformable member 53 may comprise a flexible elastomer ring or a stack of metal strips, for example.

In the continuation of the first screw 101 and in line with a linking axis AX3 parallel to the first axis AX1, there is a second screw 102 that passes through a second deformable member 55 arranged in a hole in the second support 20. The second screw 102 passes through a second hole 54 in the hub 51 in order to be screwed to a nut, the second screw 102 simply having an assembly clearance with the hub 51. Such a deformable member 55 may comprise a flexible elastomer ring or a stack of metal strips, for example.

At least one third hole in the first support 10 is traversed by a third screw 103. The third screw 103 extends along a connecting axis AX4 parallel to the linking axis AX3 and to the first axis AX1. The third screw 103 simply has an assembly clearance with the first support 10. Moreover, the third screw 103 may possibly pass through a third deformable member 57 arranged in a hole in the hub 51 in order to be screwed to a nut. Such a deformable member 57 comprises a flexible elastomer ring and a bolt, for example.

In the continuation of the third screw 103, there is a fourth screw 104 that passes through a fourth deformable member 59 arranged in a hole in the hub 51. The fourth screw 104 passes through a fourth hole 58 in the second support 20 in line with the connecting axis AX4 in order to be screwed to a nut, the fourth screw 104 simply having an assembly clearance with the second support 20. Such a deformable member 59 comprises an elastomer ring and a bolt, for example.

Figure 7:
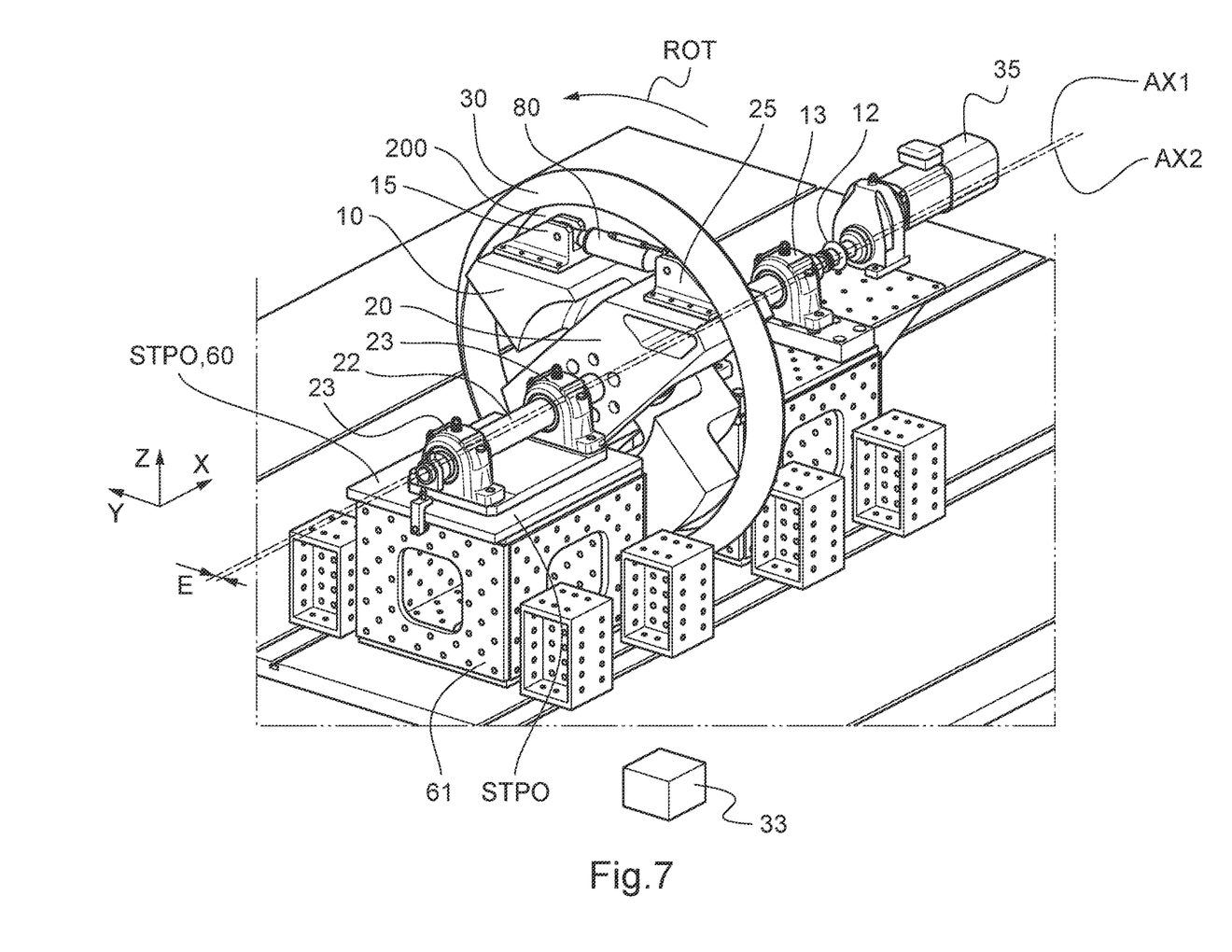
FIG. 7 is a three-dimensional view of a test bench demonstrating its operation.

FIG. 7 shows the operation of the test bench.

During an axial offsetting operation STP0, an operator moves the support member 60 in relation to the base 61 and therefore in relation to a chassis element that is stationary in the reference frame of the test bench.

Next, the operator fixes the damper 80 to the first connector 15 and to the second connector 25. If applicable, the operator arranges various monitoring sensors 43-46 on or indeed in the damper 80.

The motor 35 and/or the drive unit 36, which is not shown in FIG. 7, are started up. The damper 80 then moves ROT in the cylindrical space. When the drive unit 36 is present, this drive unit 36 may be controlled in such a way as to simulate gusts of wind. The fan and/or the camera, if provided, are started up, as the case may be.

As a result of the axial offset of the second axis of rotation AX2 of the second support 20 in relation to the first axis AX1, the first support 10 and the second support 20 perform relative movements that successively compress and extend the damper 80. The torsional stiffness of the transmission device 50, if provided, and the inertia levels of the supports, may be optimized in order to keep the relationship between the eccentricity E and the stroke of the damper 80 constant over time.

In the event of a hydraulic leak, the ejected fluid drops into the channel 30. The controller 33 may optionally shut down the motor 35, and the drive unit 36, if applicable, in the event of a leak, or indeed a leak resulting in the channel 30 collecting a volume of fluid higher than a threshold.

The dimensions of the motor 35 may be determined in order to overcome the friction forces of the bearings 13, 23, or so that the possible spring part of the damper 80 is compressed and/or to overcome the forces resulting from oil friction losses in a possible hydraulic part of the damper 80.

Apart from the friction of the bearings 13, 23, which may be constant over time, the forces of the spring part and the damping part of the damper 80 are out of phase. The motor 35 may be of moderate power in order to allow a damper 80 to be tested correctly. However, the motor 35 may be over-dimensioned in order to take into account transient start-up or speed modification phases and/or in order to carry out tests over a prolonged time period. Furthermore, the power dissipated by the damper 80 corresponds to the mechanical power supplied by the motor 35.

The dimensions of the bearings 13, 23 may be determined depending on the static forces resulting from the weight of the supports 10, 20, but also the forces applied by the damper 80 to the supports 10, 20 during the test. The bearings 13, 23, like the motor 35, may be over-dimensioned.

Naturally, the present disclosure is subject to numerous variations as regards its implementation. Although several embodiments are described above, it should readily be understood that it is not conceivable to identify exhaustively all the possible embodiments. It is naturally possible to envisage replacing any of the means described by equivalent means without going beyond the ambit of the present disclosure.

What is claimed is:

1. A test bench configured to test a drag damper, wherein the test bench comprises a first support that can be rotated about a first axis of rotation by a motor, the test bench comprising a second support that can rotate about a second axis, the second axis being axially offset from the first axis, the test bench comprising a first connector secured to the first support and a second connector secured to the second support, the first connector and the second connector being offset from the first axis and second axis, the first connector and the second connector being opposite each other along an arrangement axis and being configured to carry the damper in line with the arrangement axis.

2. The test bench according to claim 1, wherein the test bench comprises a fixed annular channel for collecting liquid, the annular channel surrounding the first support and the second support in a radial plane orthogonal to the first axis.

3. The test bench according to claim 2, wherein the test bench comprises a measurement sensor measuring the presence of fluid in the channel or in a drain of the channel, the measurement sensor communicating with a shutdown controller capable of triggering an automatic shutdown of the motor.

4. The test bench according to claim 1, wherein the test bench comprises at least one monitoring sensor to be chosen from a list comprising:
a temperature sensor to be arranged on the damper, a movement sensor to be arranged on the damper, a pressure sensor to be arranged on the damper, and a force sensor to be arranged on the damper.

5. The test bench according to claim 1, wherein the test bench comprises at least one bearing carrying a shaft constrained to rotate with the second support, the test bench comprising a rotating electrical or optical collector secured to the shaft and a non-rotating collector, the rotating collector being connected to at least one monitoring sensor.

6. The test bench according to claim 1, wherein the first support and the second support are synchronized to rotate in phase.

7. The test bench according to claim 1, wherein the test bench comprises a transmission device linking the first support to the second support, the transmission device being deformable in order to at least give the second support a restricted degree of freedom relative to the first support.

8. The test bench according to claim 1, wherein the test bench comprises a drive unit setting the second support in rotation.

9. The test bench according to claim 1, wherein the first axis is fixed in a reference frame of the test bench, the second support being carried by a support member that is able to move relative to a base that is fixed in a reference frame of the test bench in order to axially offset the second axis in relation to the first axis.

10. The test bench according to claim 9, wherein the test bench comprises a shaft constrained to rotate with the second support and guided in rotation about the second axis by at least one bearing, the bearing being secured to the support member, a position of the support member in relation to the base being adjustable according to at least one axis not parallel to the first axis in order to adjust an axial offset of the second axis in relation to the first axis.

11. The test bench according to claim 1, wherein the first connector and the second connector each comprise a clevis traversed by a pin that extends parallel to the first axis so as to pass through a ball-and-socket fitting of the damper.

12. The test bench according to claim 1, wherein the first support and the second support are nested in one another in a radial plane orthogonal to the first axis, one of the first and second supports passing through a passage of the other support orthogonally to the first axis.

13. The test bench according to claim 1, wherein the first connector and the second connector are removable.

14. The test bench according to claim 1, wherein the test bench comprises a fan turned towards the first support and the second support.

15. The test bench according to claim 1, wherein the test bench comprises a camera that is able to rotate about the first axis or the second axis and is turned at least towards a space situated between the first connector and the second connector.

* * * * *